June 24, 1924.

A. C. GROELER

APPARATUS FOR REMOVING MANURE FROM STABLES

Filed May 21, 1921

1,498,725

Inventor
Albert C. Groeler
By Morsell & Keeney
Attorneys

Patented June 24, 1924.

1,498,725

UNITED STATES PATENT OFFICE.

ALBERT C. GROELER, OF LEBANON, WISCONSIN, ASSIGNOR OF ONE-HALF TO OTTO F. GOETSCH, OF HUSTISFORD, WISCONSIN.

APPARATUS FOR REMOVING MANURE FROM STABLES.

Application filed May 21, 1921. Serial No. 471,480.

*To all whom it may concern:*

Be it known that I, ALBERT C. GROELER, a citizen of the United States, and resident of the town of Lebanon, in the county of Dodge and State of Wisconsin, and whose post-office address is Oconomowoc, Wisconsin, R. R. 3, have invented new and useful Improvements in Apparatus for Removing Manure from Stables, of which the following is a description, reference being had to the accompanying drawings, which are a part of this specification.

This invention relates to improvements in apparatus for removing manure from stables.

The primary object of the invention is to provide apparatus for this purpose of simple and strong construction which may be operated continuously or whenever desired to carry the manure out of the stable thereby maintaining the stable in a clean and sanitary condition with a minimum of labor.

A further object of the invention is to provide an endless conveyer for the purpose mentioned, a portion of which operates in a trough provided in the floor of the stable and another portion of which operates outside the stable at an incline whereby the manure carried out of the stable will be carried up the incline and then dumped into a suitable receptacle, for example, a wagon.

A further object of the invention is to provide a partition member between the upper and lower portions of the conveyer which is substantially coextensive with and parallel to said portions of the conveyer thus supporting the upper or load carrying portion of the conveyer and preventing the manure from passing through onto the lower portion thereof.

The invention consists in the novel constructions and arrangements to be hereinafter described and claimed for carrying out the above stated objects and such other objects as will appear from the following description of a certain preferred embodiment illustrated in the accompanying drawings, wherein—

Like characters of reference designate like parts in the several views.

Figure 1:
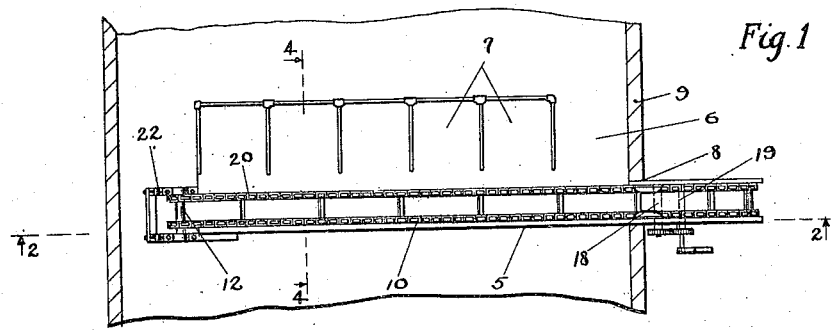
Fig. 1 is a plan view of a fragmentary portion of a stable equipped with apparatus embodying the principles of the invention.

In equipping a stable with apparatus embodying this invention, a trough 5 is provided in the floor 6 of the stable which trough extends transversely with respect to stalls 7, the outer end of said trough extending to the outside of the stable through an opening 8 formed in the wall 9 of the stable.

Figure 2:
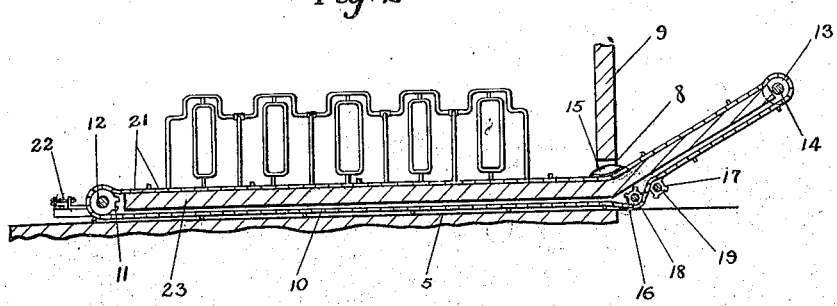
Fig. 2 is a sectional view taken on the line 2—2 of Fig. 1.
Figure 3:
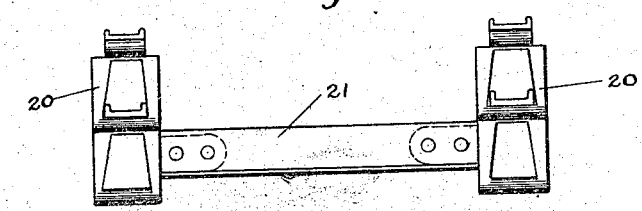
Fig. 3 is a plan view of a fragmentary portion of the conveyer.
Figure 4:
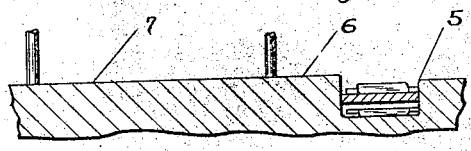
Fig. 4 is a sectional view, on an enlarged scale, taken on the line 4—4 of Fig. 1.

An endless conveyer 10 is provided for carrying the manure out of the stable which is preferably arranged so as to dump the manure into a wagon, or the like (not shown). To this end a portion of the conveyer operates inside the stable in the trough running over sprocket wheels 11 mounted on a transverse shaft 12 journaled in the inner end of the trough and another portion thereof operates outside the stable at an incline running over sprocket wheels 13 mounted on a transverse shaft 14 supported at the top of the incline in any desired manner, see Fig. 2. The two end portions of the conveyer are caused to travel at an angle to each other by a guide member 15 mounted in the wall 9 and adapted to bear upon the upper portion of the conveyer and sprocket wheels 16 and 17 mounted on shafts 18 and 19, respectively, the shaft 19 being connected to a source of power, for example, an electric motor (not shown). The conveyer comprises two endless chains 20 which are adapted to travel over the various sprocket wheels, the chains having a plurality of cross bars 21 secured thereto in any desired manner. Slack or looseness in the conveyer may be taken up by a tightening device 22 of well known construction associated with the shaft 12.

In order to support the upper portion of the conveyer under a load or in case a cow should step on it, a partition member 23 is provided, said member being positioned between the upper and lower portions of the conveyer, substantially coextensive and parallel therewith. The member 23 as thus arranged covers the lower portion of the conveyer and prevents the manure from getting onto the inside thereof.

The manure is either dropped into the trough onto the conveyer or may be brushed thereinto. The conveyer may be operated slowly and continuously or whenever desired. By the use of the apparatus described the stable may be kept clean and sanitary with a minimum of labor.

I claim:

An apparatus of the class described comprising a trough provided in the floor of a stable, one end of which is open, said trough extending through the outside wall of the stable; a transverse shaft journalled adjacent the open end of the trough; a second transverse shaft journalled in the other end of the trough; a third transverse shaft journalled outside the stable in a plane above that of the other shafts; sprocket wheels on each of said shafts; an endless conveyer including chains passing around said sprocket wheels, in said trough below the surface of the stable floor; power means associated with one of said shafts; means for tightening said conveyer chains; a horizontal partition member within said trough positioned so as to receive the manure and to lie between the upper and lower portions of said conveyer whereby the upper portion of said conveyer may remove said manure from said partition; and stationary means mounted in the opening in said wall for maintaining the upper portion of said conveyer in operative relation to the upper surfaces of said partition.

In testimony whereof, I affix my signature.

ALBERT C. GROELER.